(12) United States Patent
Hessbrüggen et al.

(10) Patent No.: US 6,920,679 B2
(45) Date of Patent: Jul. 26, 2005

(54) MACHINE TOOL

(75) Inventors: Norbert Hessbrüggen, Salach (DE); Hans Georg Böhringer, Nellingen (DE)

(73) Assignee: Emag Maschinenfabrik GmbH, Salach (DE)

( * ) Notice: Subject to any disclaimer, the term of this patent is extended or adjusted under 35 U.S.C. 154(b) by 0 days.

(21) Appl. No.: 10/686,538

(22) Filed: Oct. 14, 2003

(65) Prior Publication Data
US 2004/0154157 A1 Aug. 12, 2004

(30) Foreign Application Priority Data
Oct. 24, 2002 (DE) .......................................... 102 49 473

(51) Int. Cl.[7] .............................................. B23Q 7/00
(52) U.S. Cl. ........................... 29/563; 29/564; 29/27 C; 29/27 R
(58) Field of Search ....................... 29/563, 564, 27 C, 29/27 R, 38 A, 38 R, 38 B, 38 C, 55, 50, 54, 39, 40, 41, 37; 82/122, 129, 121, 124; 409/202, 212, 203, 217, 213; 198/468.2; 414/225.01, 226.02, 226.01

(56) References Cited

U.S. PATENT DOCUMENTS

| | | | | |
|---|---|---|---|---|
| 4,512,380 A | * | 4/1985 | Schmidt | 409/198 |
| 5,081,889 A | * | 1/1992 | Takano et al. | 82/122 |
| 5,254,068 A | * | 10/1993 | Yamada et al. | 29/27 R |
| 5,321,874 A | * | 6/1994 | Mills et al. | 29/563 |
| 5,439,431 A | * | 8/1995 | Hessbruggen et al. | 29/27 C |
| 5,699,598 A | * | 12/1997 | Hessbruggen et al. | 29/27 C |
| 6,102,838 A | * | 8/2000 | Assie | 483/14 |
| 6,692,210 B1 | * | 2/2004 | Ettelbruck | 483/14 |

FOREIGN PATENT DOCUMENTS

DE    42 36 866    5/1994

\* cited by examiner

Primary Examiner—Derris H. Banks
Assistant Examiner—Dana Ross
(74) Attorney, Agent, or Firm—Herbert Dubno

(57) ABSTRACT

A machine tool in which the workpiece is transported by a pair of longitudinal carriages with transverse and vertical carriages supporting the workpiece holders to a machining region from a workpiece replacement region. In the machining region the workpiece is displaced relative to the tool and possibly rotated. In the workpiece replacement region, the workpiece is replaced in the machine tool by a workpiece which has not been machined.

15 Claims, 3 Drawing Sheets

MACHINE TOOL

FIELD OF THE INVENTION

Our present invention relates to a machine tool, especially for turning, milling, boring and grinding of at least one workpiece. More particularly, the invention relates to a machine tool having a machine frame having a working region and a workpiece region and wherein the workpiece is movable between those regions.

BACKGROUND OF THE INVENTION

A machine tool having a working region and a workpiece replacement region is described in German patent document DE 42 36 866 A1. The workpieces are carried by two chucks and the workpiece carriers are shiftable on a bed parallel to the workpiece axes in a z-axis defined by horizontal longitudinal slides. The tool turret is mounted for vertical movement along a y-axis and the vertical slide can be shifted, in addition, along an x-axis perpendicular to the y-axis and the z-axis. The turret allows tools to be brought into engagement with a workpiece for turning, drilling or milling.

While the tool head allows for tool replacement, there is no possibility of an automatic workpiece replacement in this system.

OBJECTS OF THE INVENTION

It is, therefore, the principal object of the present invention to provide a machine tool which allows for automatic workpiece replacement and thus minimizes manual operation in a machine tool.

Another object of this invention is to improve upon prior art machine tools by enabling them to be automated further and, in particular, to allow an automatic workpiece replacement as may be desired.

It is also an object of the invention to provide an improved machine tool capable of turning, milling, drilling and grinding a workpiece in which the efficiency of sequential workpiece machining operations is increased.

It is a further object of this invention to provide a machine tool which eliminates drawbacks of prior art systems.

SUMMARY OF THE INVENTION

These objects are achieved, in accordance with the invention, in a machine tool which comprises:

a machine frame defining a working region and a workpiece-replacement region and formed with guides defining a path between the regions;

a tool carrier at the working region for receiving a tool for machining a workpiece positioned at the working region; and two workpiece carriers displaceable along the guides and formed as cross slides with automatically actuatable workpiece holders jointly engageable in common with the workpiece for automatically displacing the workpiece between the regions.

Preferably the guides are rails extending longitudinally of the machine frame and the regions are spaced longitudinally apart on the machine frame, the cross slides each having a longitudinal slide displaceable on the rails jointly with the other longitudinal slide in a first direction of movement corresponding to z-axis displacement for machining of the workpiece in the working region and displacement of the workpiece between the regions for depositing a machined workpiece in the workpiece-replacement region and receiving a workpiece to be machined in the workpiece-replacement region.

Each of the cross slides can comprise a transverse slide and the respective longitudinal slide for displacing a workpiece jointly held by the workpiece holders of the cross slides in a second direction of an x-axis perpendicular to the first direction by simultaneous movement of both the transverse slides.

The machine frame can have two spaced-apart parallel side walls between which the working region and the workpiece replacement region are located, the rails being provided on the side walls.

The workpiece holders can be respective chucks adapted to receive and automatically clamp the workpiece and at least one of the chucks can be provided with a rotating drive for rotating the respective workpiece.

The tool carrier can include a revolving head or turret for a plurality of machining tools and that can include at least one motor-driven spindle. The spindle can be displaceable on the machine frame in a direction perpendicular to a direction of displacement of a workpiece by the cross slides. In particular the spindle can be displaceable in a direction perpendicular to a rotation axis of the spindle.

A workpiece changer is provided at the workpiece replacement region for exchanging a machined workpiece held by the cross slide for a workpiece requiring machining.

Each of the longitudinal slides can have an intermediate part and lateral parts of different lengths flanking the intermediate part and riding on the rails. The longitudinal slides can be of identical configuration and offset in a plan view through 180° with respect to one another.

Vertical rails can be provided on each longitudinal slide for vertical displacement of the respective transverse slide.

The machine tool of the invention has the advantage that the tool holder, being displaceable on a cross slide, can serve for the displacement and positioning of the workpiece during machining as well as for the transport of the workpiece to effect an automatic workpiece replacement. The workpiece can thus be machined in the workpiece carrier with rotation of the workpiece and its other displacement for machining purposes and then, without other manual action on the part of the operator, automatically displace into the workpiece replacement position and there automatically deposit it. In the workpiece replacement position a new workpiece can be taken up by the carrier and transported to the machining station.

It is especially advantageous that the displacement of the workpiece carrier is effected along a movement direction of the cross slide which can be a feed or positioning movement of the workpiece for the machining operation. When the workpiece is also rotatable in the carrier, the turning operation can be carried out directly as the workpiece is held in the carrier. The rotary movement can be effected through a rotary transmission via a drive motor, preferably an annular or ring motor.

The machining frame can, as has been noted, comprise two mutually spaced but parallel side walls on which the two cross slides are displaceable with the workpiece carrier above the tool carrier. Since the workpiece is suspended from the carrier and the tools are located on the lower part of the machine tool, chips and other scraps formed by the machining operation can fall freely downwardly and be carried off without impeding the workpiece transport.

Advantageously, the tool holder can receive one or more tools and preferably is in the form of a turret or a plurality of turrets capable of rotating a plurality of tools into the appropriate position. A motor spindle arrangement can be provided to drive boring tools or drills, grinders or milling tools. Advantageously the motor spindle for driving the tools is displaceable along rails preferably in a direction perpendicular to the movement axes of the cross slide. Furthermore, the motor spindle can be pivotable about an axis perpendicular to the axis of rotation. Within effective range of the spindle, a tool magazine can be provided from which the tool required for each operation can be extracted.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
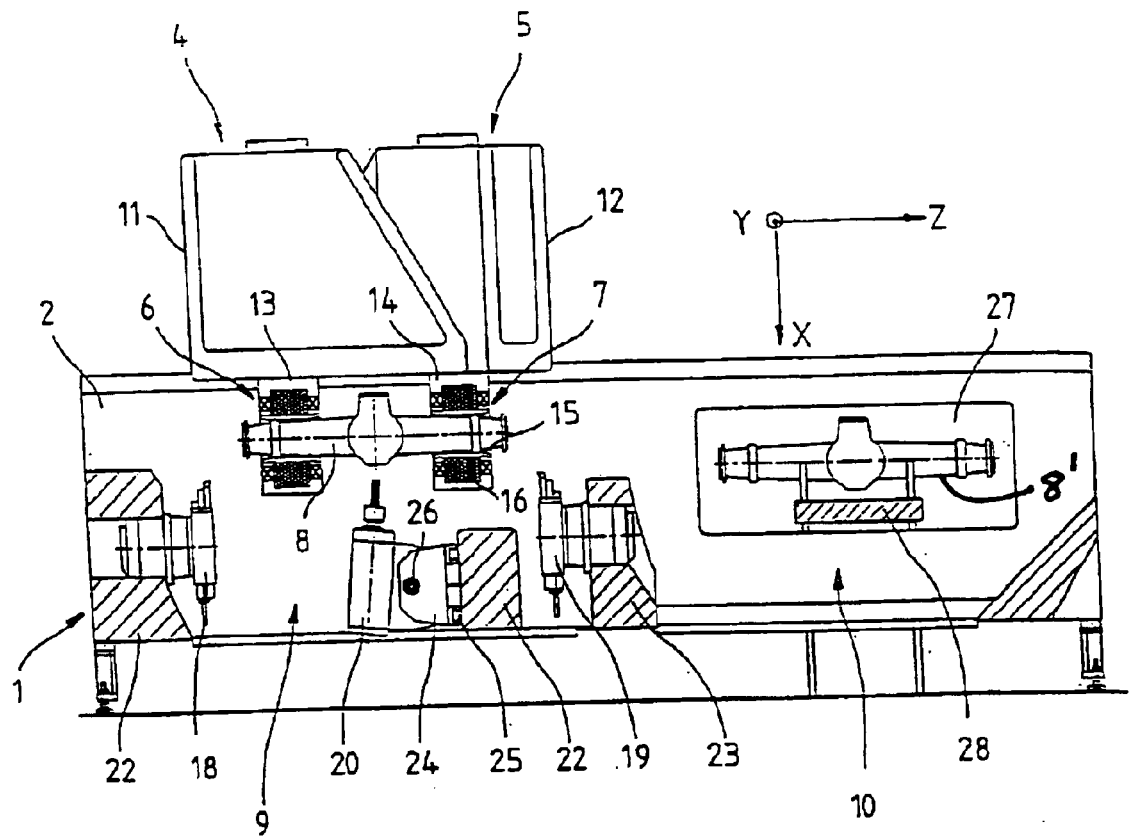
FIG. 1 is a vertical longitudinal section through a machine tool according to the invention.
Figure 2:
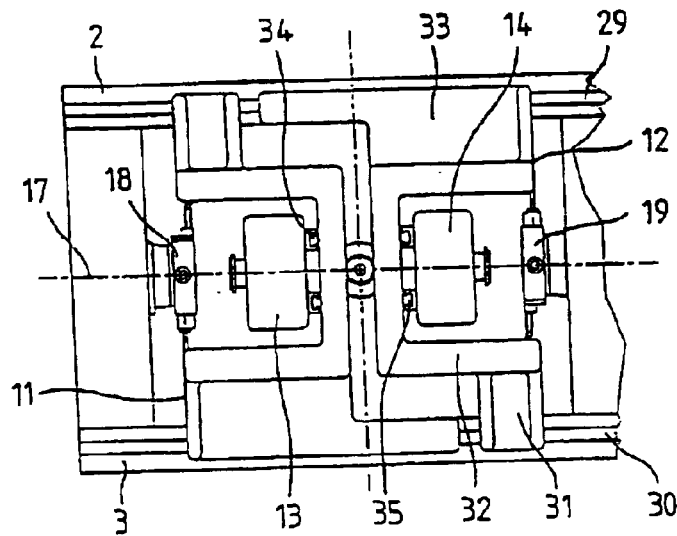
FIG. 2 is a fragmentary plan view of the machine tool seen in FIG. 1.
Figure 3:
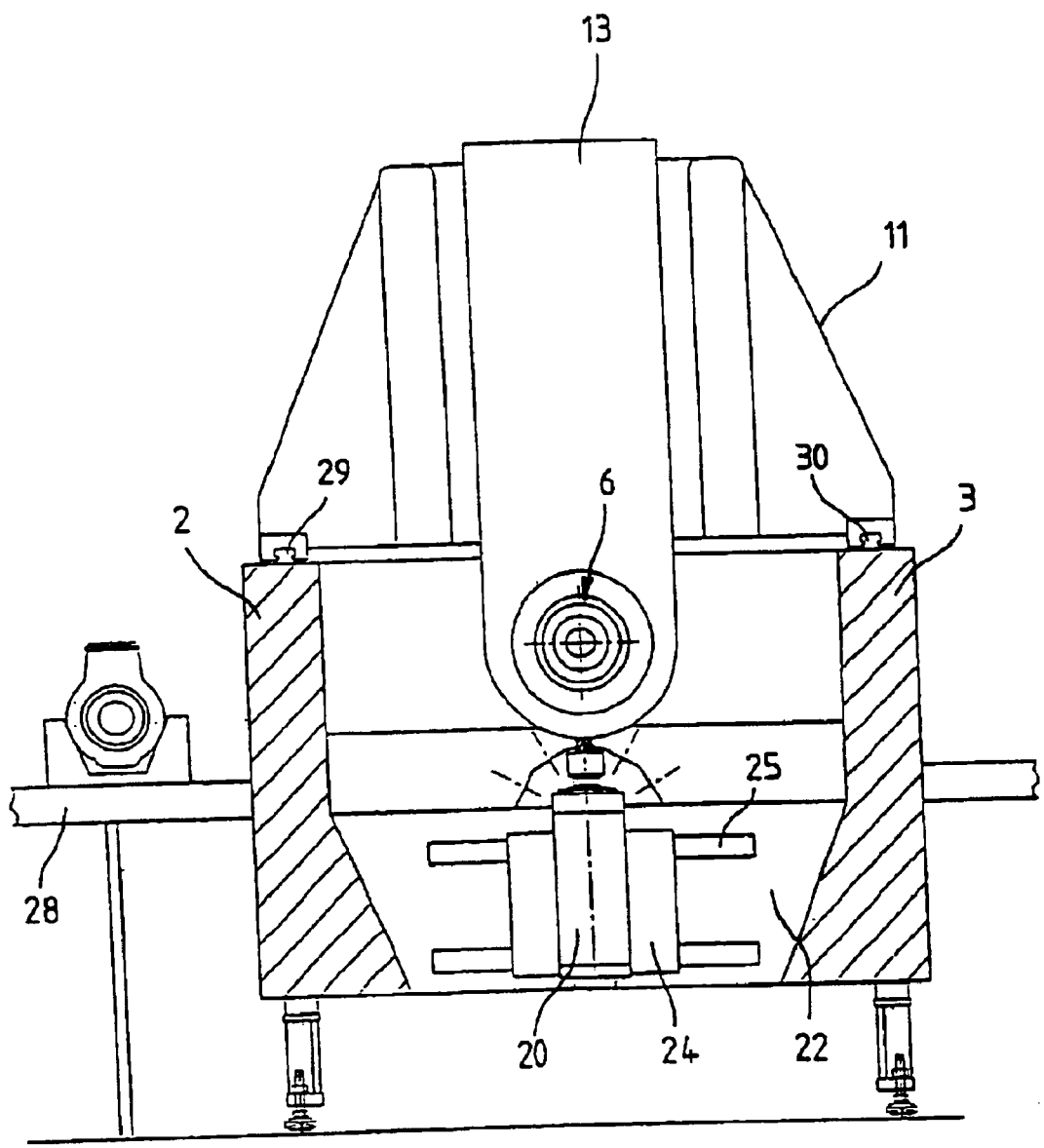
FIG. 3 is a transverse vertical section through the tool.

The machine tool shown in FIGS. 1–3 can be used for machining of workpieces, one of which has been shown at 8 in FIG. 1 in the machining position or at the machining station while another has been shown at 8' in FIG. 1 at the workpiece replacement station. The machine tool can serve for the boring, turning, grinding, milling or other machining of the workpiece 8.

The machine tool comprises a machining frame or stand 1 with two mutually spaced but parallel side walls 2 and 3 which can be vertical and can be provided with rails 29 and 30 for other guide ways for two motor-driven cross slides 4 and 5. Cross slides 4 and 5 have automatically actuatable workpiece holders or carriers 6 and 7 capable of releasably engaging the workpiece 8.

The workpiece can be transported between the machining station or region 9 at the left side of the machine, and the workpiece replacement station 10 at the right side of the machine.

The two cross slides 4 and 5 have longitudinal carriages or slides 11 and 12 which ride on the rails 29 and 30 and are thereby displaceable along a first axis of movement which has been designated the two axes in FIG. 1. The carriages 11 and 12, in turn, carry transverse carriages or slides 13 and 14 which are guided on vertical rails 34 and 35 for vertical movement, i.e. movement along a second movement axis, namely, the x-axis, perpendicular to the two axes and extending in the vertical direction. The workpiece holders or carriers 6 and 7 are carried by the carriages 13 and 14.

The two workpiece holders or carriers 6 and 7 have, in the illustrated embodiment, respective chucks 15 mounted in the two carriages 13 and 14 and which can comprise a hollow shaft with a clamping mechanism integrated therein, e.g. in the form of an annular jaw chuck or the like. The two coaxial chucks 15 are rotatable about their common central axis in the carriages 13 and 14 and can each be coupled to a respective rotary drive which can be formed as an annular motor 16. This permits a workpiece held in the holders or carriers 6 and 7 to be clamped but rotatably driven or to be positioned in a predetermined angular position for a particular machining purpose. Depending upon the shape and dimensions of the workpiece to be machined, of course, other automatically actuatable workpiece holding devices may be used.

In the machining region 9 of the machine tool, a plurality of tool carriers are disposed which, in the illustrated embodiment, are represented by two spaced apart revolving heads or turrets 18 and 19 which can pivot about a horizontal longitudinal axis 17. Between the turrets 18 and 19, a motor-driven spindle 20 is provided and both the turret heads 18 and 19 and the spindle 20 can be displaceable on transverse carriers 21, 22 and 23 which extend below the cross slides 4 and 5 between the two side walls 2 and 3 of the machine stand 1. Tools are spaced apart around the turrets 18 and 19 in a manner known per se. The motor spindle 20 is displaceable along one of the three movement axes of the longitudinal and transverse slides, in the illustrated case, along the movement axis Y. The motor spindle 20 is provided on a carriage 24 which is displaceable by a drive not shown along horizontal guide rails 25 mounted on one side of the transverse carrier 22. In addition the motor spindle 20 is pivotable about a pivot axis 26 perpendicular to its axis of rotation on the slide 24. Within the effective range of the motor spindle 20, a tool magazine can be provided for storing tools required for the machining operation and from the motor spindle can withdraw such tools and to which the motor spindle can return respective tools. In the workpiece replacement region 10, two opposite bridges 27 (workpiece changer) can be provided through which a transport device 28 in the form of a conveyor belt can pass. With this arrangement, workpieces can be brought into a predetermined workpiece replacement position within the machine tool and can be picked up by the carriers 6, 7 while a previously machined workpiece can be transported away from a receiving position to a position outside the machine tool.

As FIGS. 2 and 3 indicate, the longitudinal carriages 11 and 12 are guided on the horizontal rails 29 and 30 and are driven by drives, not shown. The two longitudinal carriages 11 and 12 are structurally identical and have, in plan view, U-shaped central regions 32 and two lateral mounting regions 31 and 33, one of which (the mounted region 31) has a smaller length while the other mounting region 33 has a greater length than the middle region 31. In the middle region 32 of each longitudinal slide 11, 12, the respective transverse carriages 13 and 14 are provided via vertical guide rails 34 and 35 so as to be vertically driven by a corresponding drive. The two longitudinal carriages 11 and 12 are rotated with respect to one another through 180° and are mounted on the side walls 2 and 3 so that they partly fit one within another and thereby ensure a highly stable structure. The different mounting regions 31 and 33 form a stable triangular seating so that the space-saving arrangement is not disadvantageous to the guide conditions, stability and the stiffness of the machine tool.

In operation, the tools of the turrets 18, 19 and of the motor spindle 20 are provided as required for the sequence of machining operation and a workpiece 8 or 8', picked up by the tool carriers 6 and 7 from the conveyor 28, is brought into the region 9 where it can be machined by a one or more tools in the turret 18, a tool in the motor spindle 20 and one or more tools of the turret 19. When machining is complete, the workpiece 8 being moved between the tool by the tool carrier and being rotated when required, the workpiece is carried into the replacement region 10 where it is deposited upon the conveyor 28 while another workpiece is picked up for machining. The movements of the workpieces and tools can be fully automated.

Figure 4:
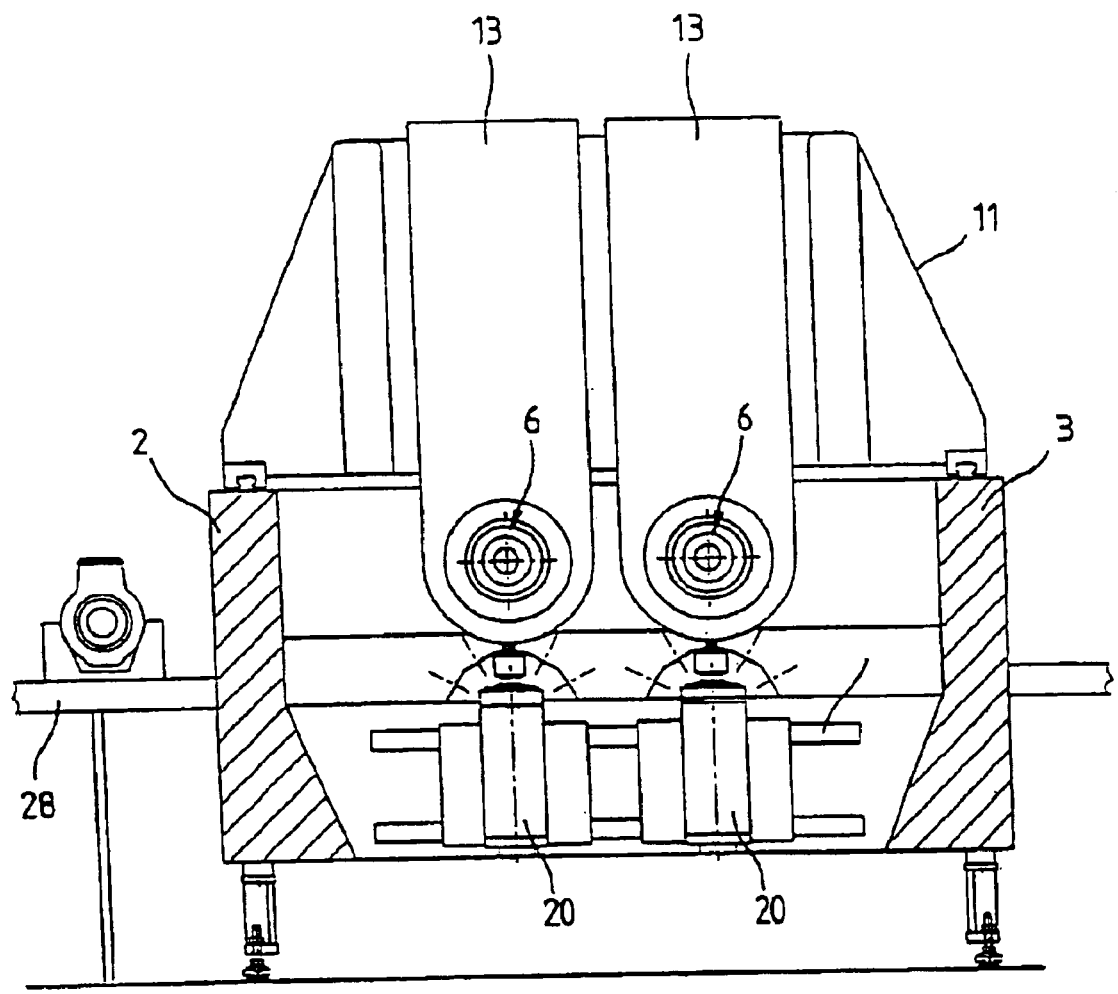
FIG. 4 is a section through a machine tool in accordance with another embodiment of the invention.

In FIG. 4 a further embodiment has been shown. This differs from the first embodiment in that the workpiece holders and tool carriers are paired so that on the two longitudinal slides 11 and 12, two pairs of vertical carriages are provided and thus two workpieces can be engaged. Two motor spindles 20 can be provided to machine the two workpieces simultaneously.

During the machining operation, the carriages supporting the workpiece holders 6 and 7 move the workpiece in the x and z direction and rotate the workpiece as required and transport the workpiece elsewhere. The machined workpiece can then be transported to the workpiece replacement region 10 for deposit on the conveyor 28. These operations can be fully automatic as can the tool replacement.

We claim:

1. A machine tool comprising:
   a machine frame defining a working region and a workpiece-replacement region and formed with guides defining a path between said regions;
   a tool carrier at said working region for receiving a tool for machining a workpiece positioned at said working region; and
   two workpiece carriers displaceable along said guides and each formed as a respective cross slide with a respective automatically actuatable workpiece holder, said workpiece holders being jointly engageable in common with said workpiece for automatically displacing said workpiece between said regions whereby said carriers serve to hold said workpiece during machining and during displacement from and back to said workpiece-replacement region.

2. The machine tool defined in claim 1 wherein said tool carrier is constructed and arranged for selectively receiving a tool for turning, milling, drilling, boring and grinding said workpiece.

3. The machine tool defined in claim 1 wherein said guides are rails extending longitudinally of said machine frame and said regions are spaced longitudinally apart on said machine frame, said cross slides each having a longitudinal slide displaceable on said rails jointly with another longitudinal slide in a first direction of movement corresponding to z-axis feed motion for machining of the workpiece in said working region and displacement of said workpiece between said regions for depositing a machined workpiece in said workpiece-replacement region and receiving a workpiece to be machined in said workpiece-replacement region.

4. The machine tool defined in claim 3 wherein each of said cross slides comprises a transverse slide on the respective longitudinal slide for displacing a workpiece jointly held by the workpiece holders of said cross slides in a second direction of an x-axis perpendicular to said first direction by simultaneous movement of both said transverse slides.

5. The machine tool defined in claim 4 wherein said machine frame has two spaced apart parallel side walls between which the working region and the workpiece-replacement region are located, said rails being provided on said side walls.

6. The machine tool defined in claim 4 wherein said workpiece holders are respective chucks adapted to receive and automatically clamp the workpiece.

7. The machine tool defined in claim 6 wherein at least one of said chucks is provided with a rotating drive for rotating the workpiece on the cross slides.

8. The machine tool defined in claim 7 wherein said tool carrier includes a revolving head for a plurality of machining tools.

9. The machine tool defined in claim 7 wherein said tool carrier includes at least one motor-driven spindle for at least one tool for machining the respective workpiece.

10. The machine tool defined in claim 9 wherein said spindle is displaceable on said machine frame in a direction perpendicular to a direction of displacement of a workpiece by said cross slides.

11. The machine tool defined in claim 9 wherein said spindle is displaceable in a direction perpendicular to a rotation axis of said spindle.

12. The machine tool defined in claim 9, further comprising a workpiece changer at said workpiece-replacement region for exchanging a machined workpiece held by said cross slides for a workpiece requiring machining.

13. The machine tool defined in claim 4 wherein each of said longitudinal slides has an intermediate part and lateral parts flanking the intermediate part and riding on said rails, the lateral parts being of different lengths.

14. The machine tool defined in claim 13 wherein said longitudinal slides are of identical configuration and are offset in a plan view through 180° with respect to one another.

15. The machine tool defined in claim 13, further comprising vertical rails on each longitudinal slide for vertical displacement of the respective transverse slide.

* * * * *